US011503308B2

United States Patent
Sjöberg et al.

(10) Patent No.: US 11,503,308 B2
(45) Date of Patent: Nov. 15, 2022

(54) PICTURE TILE ATTRIBUTES SIGNALED USING LOOP(S) OVER TILES

(71) Applicant: Telefonaktiebolaget LM Ericsson (publ), Stockholm (SE)

(72) Inventors: Rickard Sjöberg, Stockholm (SE); Mitra Damghanian, Upplands-Bro (SE); Martin Pettersson, Vallentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/282,237

(22) PCT Filed: Oct. 1, 2019

(86) PCT No.: PCT/EP2019/076583
§ 371 (c)(1),
(2) Date: Apr. 1, 2021

(87) PCT Pub. No.: WO2020/070120
PCT Pub. Date: Apr. 9, 2020

(65) Prior Publication Data
US 2021/0352301 A1 Nov. 11, 2021

Related U.S. Application Data

(60) Provisional application No. 62/740,281, filed on Oct. 2, 2018.

(51) Int. Cl.
*H04B 1/66* (2006.01)
*H04N 7/12* (2006.01)
(Continued)

(52) U.S. Cl.
CPC ......... *H04N 19/174* (2014.11); *H04N 19/119* (2014.11); *H04N 19/124* (2014.11); *H04N 19/70* (2014.11); *H04N 19/82* (2014.11)

(58) Field of Classification Search
CPC ..... H04N 19/82; H04N 19/119; H04N 19/169
See application file for complete search history.

(56) References Cited

U.S. PATENT DOCUMENTS

2013/0107973 A1* 5/2013 Wang ............... H04N 19/82
375/E7.193
2015/0030068 A1* 1/2015 Sato ............... H04N 19/124
375/240.03

(Continued)

OTHER PUBLICATIONS

Misra, K. et al., "New results for parallel decoding for Tiles", Joint Collaborative Team on Video Coding (JCT-VC) of ITU-T SG16WP3 and ISO/IEC JTC1/SC29/WG11, 6th Meeting, Jul. 14-22, 2011, pp. 1-6, Torino, IT.

(Continued)

*Primary Examiner* — Fabio S Lima
(74) *Attorney, Agent, or Firm* — Coats & Bennett, PLLC

(57) ABSTRACT

In encoding a picture, comprising a plurality of tiles, into a bit-stream, a method and apparatus is provided for signaling the tile attribute values per-tile, using a compact syntax. These embodiments signal per-tile attribute values using a loop over the tiles. The tile attributes may, for example, be in the form of a set of tile syntax elements (one syntax element per tile attribute), or for example in the form of a set of flags to enable or disable the usage of the tile attributes. These embodiments provide freedom for an encoder to assign the tile attribute values per tile, or per any subset of tiles in a picture, and the attribute values are signaled in a compact syntax using a loop (or loops) over tiles.

25 Claims, 6 Drawing Sheets

(51) Int. Cl.
    *H04N 11/02*     (2006.01)
    *H04N 11/04*     (2006.01)
    *H04N 19/174*     (2014.01)
    *H04N 19/119*     (2014.01)
    *H04N 19/124*     (2014.01)
    *H04N 19/70*     (2014.01)
    *H04N 19/82*     (2014.01)

(56) References Cited

U.S. PATENT DOCUMENTS

| | | | |
|---|---|---|---|
| 2017/0214920 A1* | 7/2017 | Wang | H04N 19/176 |
| 2018/0199065 A1* | 7/2018 | Adams | H04N 19/503 |
| 2019/0166376 A1* | 5/2019 | Thomas | H04N 19/174 |
| 2021/0203973 A1* | 7/2021 | Skupin | H04N 19/70 |
| 2021/0368173 A1* | 11/2021 | Taquet | H04N 19/188 |

OTHER PUBLICATIONS

Bross, B. et al., "High Efficiency Video Coding (HEVC) text specification draft 9", Joint Collaborative Team on Video Coding (JCT-VC) of ITU-T SG16WP3 and ISO/IEC JTC1/SC29/WG11, 11th Meeting, Oct. 10-19, 2012, pp. 1-279, Shanghai, CN.

Hannuksela, M., et al., "Header parameter set (HPS)", Joint Video Experts Team (JVET) of ITU-T SG16WP3 and ISO/IEC JTC1/SC29/WG11, 12th Meeting, Oct. 3-12, 2018, pp. 1-5, Macao, CN.

Gabriel, A. et al., "Proposed design of high-level syntax for spatial relation between independent HEVC sub bitstreams", Joint Collaborative Team on Video Coding (JCT-VC) of ITU-T SG16WP3 and ISO/IEC JTC1/SC29/WG11, 28th Meeting, Jul. 15-21, 2017, pp. 1-8, Torino, IT.

* cited by examiner

PICTURE TILE ATTRIBUTES SIGNALED USING LOOP(S) OVER TILES

TECHNICAL FIELD

The present disclosure relates generally to video encoding and decoding techniques, and more particularly, to encoding and decoding per-tile parameter attributes by looping over some or all tiles in an image.

BACKGROUND

High Efficiency Video Coding (HEVC) is a block based video codec standardized by both the ITU-T and the Moving Picture Experts Group (MPEG) that utilizes both spatial and temporal prediction techniques. Spatial prediction reduces spatial redundancy and is achieved using intra (I) prediction from within the same frame of a current picture. Temporal prediction reduces temporal redundancy and is achieved using inter (P) or bi-directional inter (B) prediction on a block level using previously decoded reference pictures. Regardless of the particular type of prediction technique, however, the resultant differences between the original pixel data and the predicted pixel data, referred to as the "residual," is transformed into the frequency domain and quantized. Quantizing the transformed residuals, the level of which is determined by the quantization parameter (QP), facilitates the control of a tradeoff between bitrate and the quality of the video.

The transformed and quantized residual is then entropy coded before being transmitted to a decoder together with the necessary prediction parameters. The prediction parameters, which are also entropy encoded, include prediction mode and motion vectors. Upon receipt, the decoder performs entropy decoding, inverse quantization, and inverse transformation to obtain the residual. The decoder then reconstructs the image from the residual using an intra-prediction or inter-prediction technique.

Both MPEG and ITU-T are working on a successor to HEVC within the Joint Video Exploratory Team (JVET). The name of this video codec is Versatile Video Coding (VCC).

SUMMARY

Embodiments of the present disclosure signal per-tile attribute values for a picture using a loop over the tiles. The tile attributes may, for example, be in the form of a set of tile syntax elements (one syntax element per tile attribute), or for example in the form of a set of flags to enable or disable the usage of the tile attributes. These embodiments provide freedom for an encoder to assign the tile attribute values per tile, or per any subset of tiles in a picture, and the attribute values are signaled in a compact syntax using a loop (or loops) over tiles.

One embodiment relates to a method of encoding a picture. A picture is divided into a plurality of tiles. One or more tile attributes are associated with one or more tiles. Each tile attribute comprises a syntax element or a flag indicating the applicability of a tile attribute. One or more tile attributes are assigned to a tile or subset of tiles. The picture and the tile attributes are signaled in a bit stream, the tile attributes signaled using one or more loops over the tiles.

Another embodiment relates to a method of decoding a picture. A bit stream comprising a picture divided into a plurality of tiles, and one or more tile attributes associated with one or more tiles is received. Each tile attribute comprises a syntax element or a flag indicating the applicability of a tile attribute. The tile attributes are applied to the tiles using one or more loops over the tiles.

DETAILED DESCRIPTION

Quad Tree and Binary Tree (QTBT) Structure

As previously stated, HEVC is a block based video codec standardized by ITU-T and MPEG that utilizes both temporal and spatial prediction. HEVC uses a block structure where each top level coding block, i.e. the largest block in the coding block partitioning referred to herein as the Coding Tree Unit (CTU), is partitioned by a Quad Tree (QT) structure. This partitioning produces coding block partitions, referred to herein as coding units (CUs). The CUs can then be further partitioned, recursively, into smaller equally sized CUs with the quad tree structure down to an 8×8 block size.

The block structure in the current version of VVC is different than the block structure in HEVC. Particularly, the block structure in VVC is referred to as Quad Tree plus Binary Tree plus Ternary Tree block structure (QTBT+TT). A CU in QTBT+TT can have either square or rectangular shapes. A coding tree unit (CTU) is first partitioned by a quad tree structure as in HEVC. Then it is further partitioned with equally sized partitions either vertically or horizontally in a binary structure to form coding blocks (also referred to as CUs). A block could thus have either a square or rectangular shape.

Figure 1:
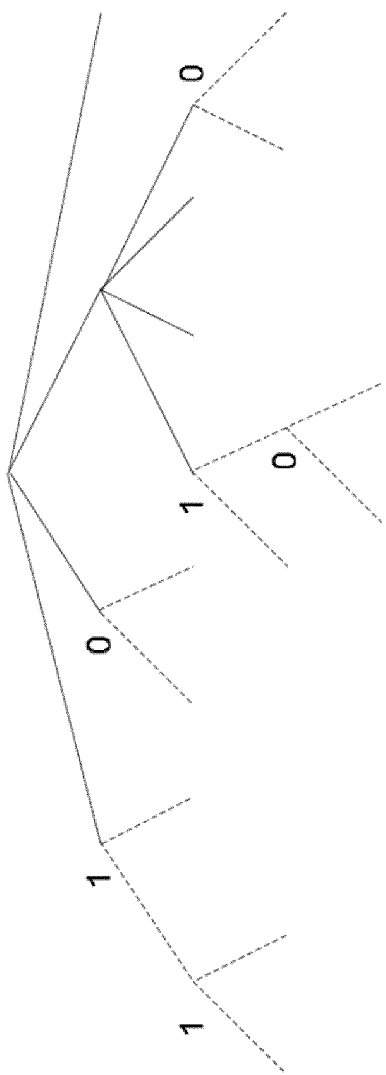
FIG. 1 illustrates an example of partitioning a CTU into CUs using QTBT.
Figure 1:
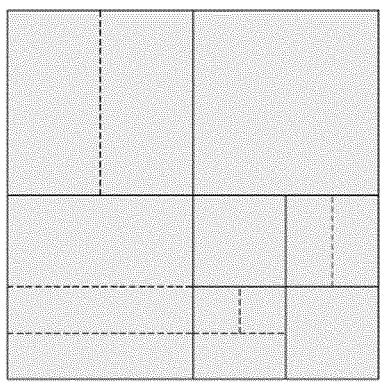

The depth of the quad tree and the binary tree can be set by the encoder in the bitstream. An example of dividing a CTU using QTBT+TT is illustrated in FIG. 1. The TT allows the CU to be divided into three partitions instead of two equally sized partitions. This increases the possibility of using a block structure that better fits the content structure in a picture.

Context Adaptive Binary Arithmetic Coding (CABAC)

Context Adaptive Binary Arithmetic Coding (CABAC) is an entropy coding tool used in HEVC and VVC. CABAC is configured to encode binary symbols, which keeps complexity low and allows modelling of probabilities for bits of a symbol that are more frequently used. The probability models are selected adaptively based on local context, since coding modes are usually well correlated locally.

Slices

The concept of slices in HEVC divides the picture into independently coded slices, where each slice is read in raster scan order in units of CTUs. Different coding types could be used for slices of the same picture. For example, a slice could either be an I-slice, P-slice or B-slice. However, the main purpose of slices is to enable resynchronization in case of a loss of data.

Tiles

Figure 2:
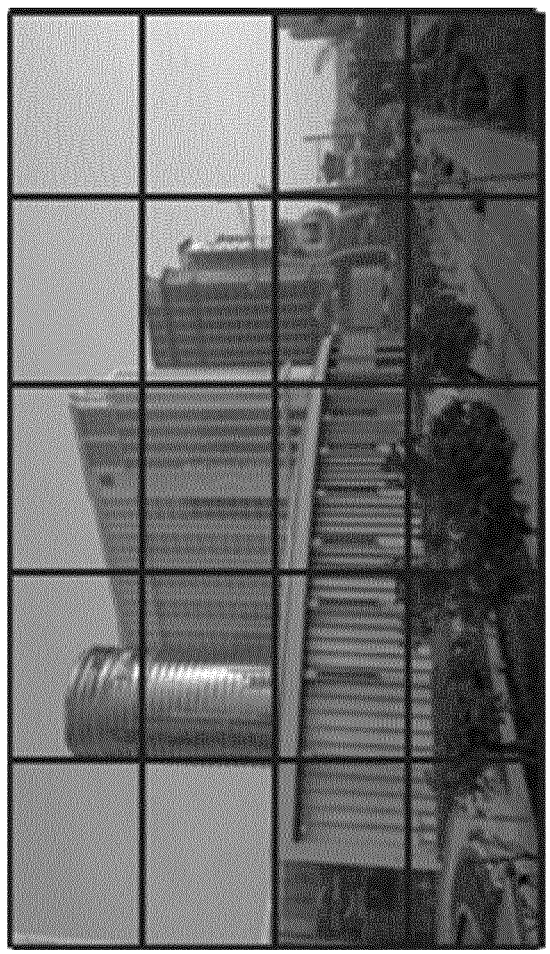
FIG. 2 illustrates an example tile partitioning.

The HEVC video coding standard also includes a tool called "Tiles" that divides a picture into rectangular, spatially independent regions. Using tiles, a picture in HEVC can be partitioned into rows and columns of samples where any given tile is located at an intersection of a given row and a given column. FIG. 2 shows an example of a tile partitioning using four (4) rows of tiles and five (5) columns of tiles resulting in a total of twenty (20) tiles for the picture. As seen in FIG. 2, the tiles in HEVC are always aligned with CTU boundaries.

The tile structure is signaled in the Picture Parameter Set (PPS) by specifying the thicknesses of the rows and the widths of the columns. Individual rows and columns can have different sizes, but the partitioning always span across the entire picture, from left to right and top to bottom respectively.

The PPS syntax used for specifying the tile structure in HEVC is listed in Table 1. As seen in Table 1, a flag (i.e., the tiles_enabled_flag) indicates whether tiles are used or not used. If the tiles_enabled_flag is set, the number of tiles columns (i.e., num_tile_columns_minus1) and rows (i.e., num_tile_rows_minus1) are specified. The uniform_spacing_flag is a flag that specifies whether the column widths and row heights are explicitly signaled, or whether a pre-defined method to space the tile borders evenly should be used. If explicit signaling is indicated, the column widths are signaled one-by-one followed by the row heights. The column width and row height information is signaled in CTU units. Finally, the flag loop_filter_across_tiles_enabled_flag specifies whether in-loop filters across tile boundaries are turned on or off for all tile boundaries in the picture.

TABLE 1

Tile syntax in HEVC

| | Descriptor |
|---|---|
| pic_parameter_set_rbsp( ) { | |
| ... | |
|    tiles_enabled_flag | u(1) |
| ... | |
|    if( tiles_enabled_flag ) { | |
|       num_tile_columns_minus1 | ue(v) |
|       num_tile_rows_minus1 | ue(v) |
|       uniform_spacing_flag | u(1) |
|       if( !uniform_spacing_flag ) { | |
|          for( i = 0; i < num_tile_columns_minus1; i++ ) | |
|             column_width_minus1[ i ] | ue(v) |
|          for( i = 0; i < num_tile_rows_minus1; i++ ) | |
|             row_height_minus1[ i ] | ue(v) |
|       } | |
|       loop_filter_across_tiles_enabled_flag | u(1) |
|    } | |
| ... | |

Similar to slices, there is no decoding dependency between tiles of the same picture. This includes intra prediction, context selection, and motion vector prediction. One exception, however, is that in-loop filtering dependencies are generally allowed between tiles. Those dependencies can, however, be disabled by setting the loop_filter_across_tiles_enabled_flag appropriately.

In contrast to slices, tiles do not require as much header data. The header overhead per tile comprises the signaling of bit-stream offsets, which are present in the slice header and indicate the starting point of all tiles in a picture. A decoder decodes the starting points to enable splitting the coded picture into coded tiles in order to distribute them for parallel decoding. In HEVC, the inclusion of bit-stream offsets in the slice header is mandatory when tiles are enabled. However, the combination of tiles and slices is restricted in HEVC. Particularly, either all CTUs in a tile belong to the same slice or all CTUs belong to the same tile.

Bit-stream offsets can also allow the extraction of tiles and stitching of tiles to re-constitute the tiles into an output stream. This requires some encoder side constraints to make the tiles temporally independent. One constraint restricts motion vectors so that motion compensation for a tile only uses samples included in spatially co-located tiles of previous pictures. Another constraint restricts temporal motion vector prediction (TMVP) such that this process is made temporally independent. For complete independence, the deblocking of boundaries between tiles, and Sample Adaptive Offset (SAO) filter operations between times, must be disabled via the previously described loop_filter_across_tiles_enabled_flag. However, disabling deblocking may introduce visible lines between tiles. Therefore, some implementations disable deblocking while other implementations do not. Motion constrained tile set (MCTS) is a feature in HEVC for signaling the encoder side constraints for temporal independent tile sets. A tile set in MCTS covers one or more tiles of a picture.

Tiles are sometimes used for 360-degree video that is intended for consumption using head-mounted display (HMD) devices. The field-of-view when using today's HMD devices is limited to around 20% of a full sphere. This means that only 20% of the full 360-degree video is consumed by the user. Typically, the entire 360-degree video sphere is made available to the HMD device, which then crops out the part that is rendered for the user. That part, i.e., the part of the sphere the user sees, is called the viewport. A well-known optimization of resources is to make the HMD device video system aware of head movements and the direction the user is looking, so that fewer resources are spent on processing video samples that are not rendered to the user. The resources can be, for example, bandwidth from a server to a client or the decoding capability of the device. For future HMD devices, where the field of view will be larger than is currently possible, a non-uniform resource allocation would still be beneficial. Particularly, the human vision system demands a higher image quality in the central vision area (about 18° horizontal view), while a lower demand is placed on the image quality in the peripheral region (about 120° or more for a comfortable horizontal view). Therefore, non-uniform resource allocation would be helpful to meet the demands of the human vision system with more resources being allocated in the central vision area as compared to the peripheral region.

Optimizing resources to the Region of Interest (RoI) is another use case for tiles. RoI can be specified in the content or extracted by methods such as eye tracking. One method of using head movements to reduce the amount of required resources is to use tiles. This method first encodes the video sequence multiple times using tiles. The tile partitioning structure is the same in all encodings; however, the video sequence is encoded at different video qualities. This produces at least one high-quality encoding for the video sequence and one low-quality encoding for the video sequence. This means that for each tile at a particular point in time, there are at least one high-quality tile representation and at least one low-quality tile representation. The difference between a high-quality tile and a low-quality tile can be that the high-quality tile is encoded at a higher bitrate than the low-quality tile, or that the high-quality tile is of higher resolution than the low-quality tile.

Figure 3B:
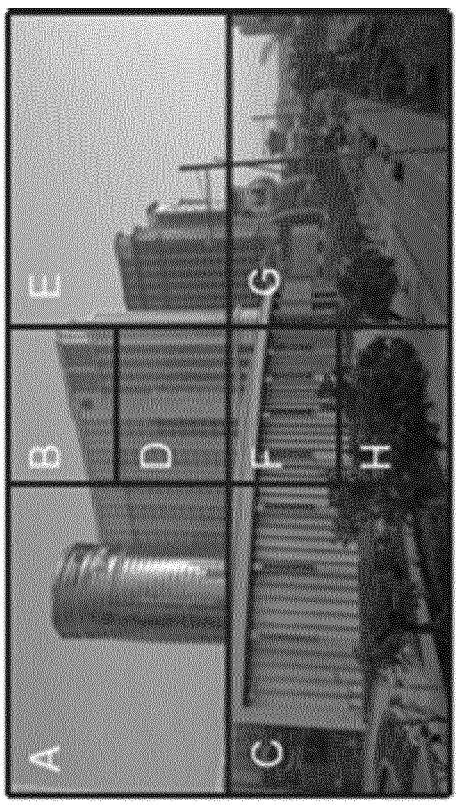
FIGS. 3A-3B illustrates an example tiling structure with high resolution and low resolution tiles.
Figure 3A:
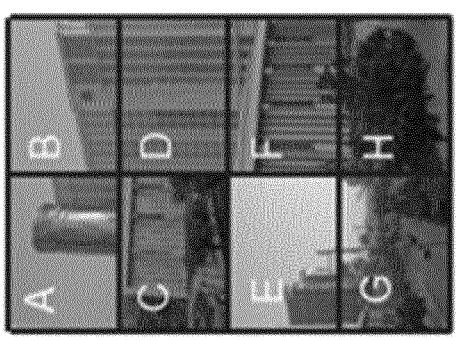

FIGS. 3A-3B illustrate an example of high-quality tiles having higher resolution than low-quality tiles. Particularly, FIG. 3A illustrates a picture that just has been decoded by a decoder. In this context, pictures showing the output from the decoder (i.e., the decoded pictures) are pictures shown in the compressed domain. In this example, all 8 tiles A-H in the compressed domain are of equal spatial size. Then, after the picture is decoded, but before the picture is rendered, the tiles A-H are scaled and arranged spatially. Pictures that have been prepared for rendering (i.e., after scaling and re-arrangement) are pictures to be shown in the output domain. The output domain, seen in FIG. 3B, illustrates the picture as it is rendered or presented to the user.

As seen in FIGS. 3A-3B, tiles B, D, F, and H are high-quality tiles since they are of higher resolution in the output domain. Tiles A, C, E, and G, however, are low-resolution tiles since the scaling step decreases the actual resolution.

Besides illustrating how tiles have different resolutions, FIGS. 3A-3B also illustrate that tiles in the compressed domain (FIG. 3A) do not need to be spatially ordered in the same way as they are ordered in the output domain (FIG. 3B). Given that the tiles are both spatially and temporally independent, the spatial placement of tiles in the compressed domain is not vital.

There are multiple elements that increase bit-costs when enabling tiles in HEVC. First, prediction across tiles is disabled, which means that motion vectors and intra modes are not predicted across tiles. The use of tiles also disables quantization parameter (QP) prediction and context selection. Second, CABAC is initialized for each tile, which means that CABAC adaptation is impaired. Third, bitstream offsets must be signaled for each tile. Fourth, the tile partitioning structure needs to be specified in the PPS. Finally, CABAC is flushed after each tile and the coded data has to be byte-aligned.

Figure 4:
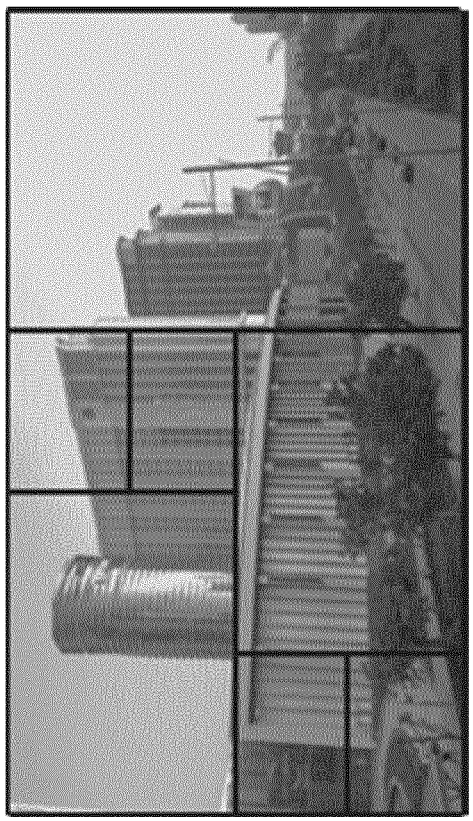
FIG. 4 illustrates an example of a tile structure that is not supported in HEVC.

Tiles are useful; however, there are some considerations that need to be addressed. For example, in its current form, HEVC restricts tiles to ensure that they span across the entire picture. This limits the flexibility of tiles, however. For example, FIG. 4 illustrates an example of a tile structure that is not supported by the current implementation of HEVC.

In JVET-K0260, the concept of flexible tiles was proposed. In this proposal, pictures may be divided into tiles in a more flexible way than only defining the number of tile rows and tile columns, as in HEVC. JVET-K0260 proposed the tile syntax listed in Table 2 below for expressing flexible tiles.

TABLE 2

| Flexible tile syntax from JVET-K0260 | |
| --- | --- |
| pic_parameter_set_rbsp( ) { | Descriptor |
| ... | |
|    tiles_enabled_flag | u(1) |
| ... | |
|    if( tiles_enabled_flag ) { | |
|       number_of_tiles_in_picture_minus2 | ue(v) |

TABLE 2-continued

| Flexible tile syntax from JVET-K0260 | |
| --- | --- |
|       subtile_width_minus1 | ue(v) |
|       subtile_height_minus1 | ue(v) |
|       for( i = 0; i < number_of_tiles_in_picture_minus2+2; i++ ) { | |
|          if (i>0) | |
|             use_previous_tile_size_flag | u(1) |
|          if (use_previous_tile_size_flag == 0) { | |
|             tile_width_minus1[i] | ue(v) |
|             tile_height_minus1[i] | ue(v) |
|          } | |
|       } | |
|       loop_filter_across_tiles_enabled_flag | u(1) |
| } | |
| ... | | where
number_of_tiles_in_picture_minus2 specifies the number of tiles in a picture;
subtile_width_minus1 specifies the width of the subtile unit in coding tree units;
subtile_height_minus1 specifies the height of the subtile unit in coding tree units;
use_previous_tile_size_flag equal to 1 specifies that the size of the current tile is equal to the size of the previous tile. use_previous_tile_size_flag equal to 0 specifies that the size of the current tile is not equal to the size of the previous tile. When not present, the value of use_previous_tile_size_flag is inferred to be equal to 0;
tile_width_minus1[i] plus 1 specifies the width of the i-th tile in subtile units; and
tile_height_minus1[i] plus 1 specifies the height of the i-th tile in subtile units.

Stereo Video and Texture Plus Depth

Figure 5:
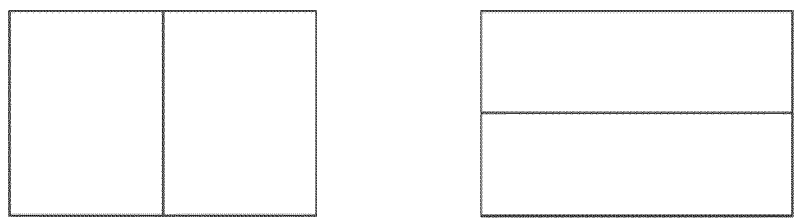
FIG. 5 illustrates two examples of frame packing (horizontal and vertical).

Stereo video is known in the art. In stereo video, each eye receives a separate view, in which the viewpoint for the second view is shifted slightly as compared to the first view. Stereo video is commonly packed into one frame, either using side-by-side packing or top-bottom packing, as depicted in FIG. 5. One drawback to stereo video is that the immersive experience is reduced if the user is moving, since the viewpoints for the stereo video are fixed.

To be able to at least partly look around objects, i.e., to slightly shift viewports, a combination of texture and depth information may be used where additional views may be synthesized from the texture and depth information. Texture plus depth, sometimes referred to as 2D plus depth, is typically also frame packed within one picture, either side-by-side, top-bottom or in some other way.

MPEG is currently working on some activities for immersive video, to be published in the MPEG-I set of standards. One activity is about 3 degrees of freedom (3DoF), also known as 360° video, where the user may look in all directions of the sphere using a head mounted display (HMD). As for stereo video, the viewpoint is fixed.

Deficiencies of the Prior Art

HEVC uses the tile tool to divide a picture into independent regions. Tile boundaries break parsing and spatial prediction dependencies, so that a tile can be processed independently from other tiles. In HEVC, however, tiles are not independent from each other in the definition of their geometry and attributes. QP define attributes in HEVC, the geometry of the tiles is constrained by the tile grid given in the form of rows and columns, and tile attributes are not defined per tile but instead for all the tiles in a picture or all the tiles in a slice. One example of such a tile attribute is delta-QP, which is set for all the tiles in a slice or MCTS which is set for a set of tiles in a picture. In HEVC, the initial QP for each tile is set by the delta-QP (slice_qp_delta) code word in the slice header. The HEVC specification specifies that the initial QP value to use for each tile (the Tile QP) is set to 26+init_qp_minus26+slice_qp_delta, where init_qp_minus26 is a code word in the PPS. Thus, all tiles in a slice share the same initial QP value and there is no possibility in HEVC to have different initial QP values for tiles belonging to the same slice. Other examples of a tile attribute are any slice header syntax element in HEVC.

The flexible tile concept removes the row and column constraint from the tiles and allows for more flexible picture partitioning, enabling to partition the pictures into rectangular tiles without overlaps. However, the tile attributes are still constrained, as they are not defined per tile but rather are defined in the level of picture parameter set (PPS) or slice level, for all the tiles in the picture or slice. One way of conveying different attribute values per tile is to use one slice per tile. This will however increase the bit cost and might not be applicable to flexible tile structures like the structure shown in FIG. 4. This solution will also not work on tile attributes which are defined at the picture level.

Features of Some Embodiments

Embodiments of the present disclosure address these issues by providing a means for signaling the tile attribute values per-tile, using a compact syntax. These embodiments signal per-tile attribute values using a loop over the tiles. The tile attributes may, for example, be in the form of a set of tile syntax elements (one syntax element per tile attribute), or for example in the form of a set of flags to enable or disable the usage of the tile attributes. These embodiments provide freedom for an encoder to assign the tile attribute values per tile, or per any subset of tiles in a picture, and the attribute values are signaled in a compact syntax using a loop (or loops) over tiles.

Tile attributes supported by embodiments of this disclosure may for example include, but are not limited to, the delta_QP, deblocking strength, and tile boundary treatment flags (e.g., for MCTS and in-loop filtering).

In one embodiment, tile attribute sets are defined, where each set has a particular set_id. A loop over the tiles in the picture parameter set (PPS), slice header, picture header, tile group header, or tile header signals the proper set_id for each tile.

In one embodiment, the number of tile attributes in each tile attribute set is signaled explicitly.

In one embodiment, the tile attribute values are given in the PPS and the loop over the tiles is placed in a tile or a slice header.

In one embodiment, the tile attributes are not signaled in a parameter set but the attributes are signaled in the segment header directly.

In one embodiment, an initial set of tile attributes is signaled, followed by a set of flags for each tile to enable or disable QP. If QP is disabled, as a fallback, each tile attribute in the initial tile attribute set is used for the current tile.

In one embodiment, an initial set of tile attributes is signaled, followed by a set of copy flags for each tile, where each flag specifies if an attribute value should be copied from the tile attribute list or explicitly signaled for a specific tile.

In one embodiment, a delta_QP is signaled per tile, and the final initial tile or block QP is calculated as the sum of the decoder reference QP values from the sequences parameter set or picture parameter set, plus the tile delta_QP, plus the optional delta_QP signaled for the block.

General Description

Embodiments of the present disclosure introduce the concept of signaling per-tile attribute values in a compact way by looping over the tiles in the level of PPS, picture header, slice header, or tile header. A tile attribute could also be referred to as a tile property or a tile parameter.

One example of the tile attributes to be defined per tile according to embodiments is delta_QP. A delta_QP value could be defined as the difference between the quantization parameter (QP) value of a reference and that for the tile. The reference QP value may be the QP value signaled for a parameter set, picture, slice, or similar. The QP value for a tile may be the initial QP value for the tile, e.g., the QP value used for the first block in the tile, or the QP value to use for predicting the QP value for the first block in the tile.

A delta_QP value could also be defined as the difference between the QP value of the previous tile and the current tile. In one example, if a defined tile region in the picture has texture content and another tile region in the picture has depth content, it may be beneficial to define the delta_QP per tile, as different tiles may want to use different QP values. One tile may be coded using a high QP value and one tile may be coded using a low QP value.

Deblocking parameters are further examples of tile attributes. In HEVC, the strength of the deblocking filter can be adjusted by the encoder on the picture and the slice basis. According to embodiments of the present disclosure, deblocking parameters, such as deblocking strength, can be provided per tile, and therefore can be adapted to the content of each tile.

In HEVC, tile boundaries, similar to slice boundaries, do break parsing and spatial prediction dependencies, so that a tile can be processed independently, but the in-loop filters (deblocking and SAO) may still cross tile boundaries in order to optionally prevent tile border artifacts. This functionality is controlled by the loop_filter_across_tiles_enabled_flag syntax element in the PPS. Setting this functionality per tile is another example of a tile attribute that is set per tile according to embodiments disclosed herein. In embodiments, in cases where some of the tiles in a slice in the picture are independent in their contents but some other tiles are dependent, it is possible to set the loop_filter_across_tiles_enabled_flag per tile, which means to disable it for the tiles with independent content and enable it for the tiles with dependent content.

Motion constraints, as defined for motion constrained tile set (MCTS) in HEVC, are further examples of tile attributes that may be defined per tile according to embodiments disclosed herein. MCTS set equal to one forbids using motion vectors across tile borders. In HEVC, MCTS is set at the PPS level and is applied to all tiles in the picture. Having a per-tile definition of motion constraints, as one of the tile attributes according to embodiments, allows motion prediction across some of the tile borders, and forbids motion prediction across other tile borders, which might be useful in applications with a mix of dependent and independent tile contents. Another possible tile attribute is to signal to which MCTS a tile belongs.

Of course, tile attributes are not be limited to the above-mentioned examples.

In all the following disclosed embodiments, it is assumed that the parameter for the number of tiles in the picture is given by the tile structure. For example, in HEVC the number of tiles is given by (num_tile_columns_minus1+1) *(num_tile_rows_minus1+1). In the flexible tile syntax as given in Table 2, this parameter is given by number_of_tiles_in_picture_minus2+2.

Embodiment 1—Tile Attribute Set ID

In one embodiment, tile attribute values are signaled per tile using a loop over the tiles in the PPS. At least one set of tile attributes is defined in the PPS, where each set contains at least one syntax element related to the tile attributes. In another part of the PPS, in a loop over the tiles, the index of the tile attribute set to use for each tile is signaled.

The following example encoder steps may be applied for the construction and signaling of tile attributes:
1. If all the tiles have the same attribute values, create one attribute set with one set_id. If there exist at least two tiles in the picture with different tile attribute values, create at least two tile attribute sets and assign a unique set_id to each of the at least two tile attribute sets.
2. For each tile in the picture, set the tile_attribute_set_id value to the set_id value of the relevant tile attribute set.
3. Signal the following in the bitstream: the number of tile attribute sets, the value of each tile attribute in each tile attribute set, and the tile_attribute_set_id for each tile.

The following example decoder steps may be applied to extract tile attribute values from the bit stream for the current embodiment and use them during decoding:
1. Parse the number of tile attribute sets.
2. For each tile attribute set, parse the tile attributes in that set, store the values (A) and assign them to a set id.
3. For a tile (T) in a picture, parse a tile_attribute_set_id code word and use the value (B) of tile_attribute_set_id to identify a tile attribute set.
4. Use the values (A) stored and assigned to the set id that corresponds to the value (B) to decode the tile (T).

An example syntax table and semantics description for embodiment 1 on top of the HEVC video coding specification is provided in Table 3.

TABLE 3

Tile attribute set ID

```
pic_parameter_set_rbsp( ) {                             Descriptor
    ...
    tiles_enabled_flag                                  u(1)
    ...
    if( tiles_enabled_flag ) {
        ...
        number_of_tile_attribute_sets_minus1            ue(v)
        for( i = 0; i <
        number_of_tile_attribute_sets_minus1+1; i++ ) {
            tile_attribute [i]                          ue(v)
        }
        if (number_of_tile_attribute_sets_minus1 > 0) {
            for( i = 0; i < number_of_tiles_in_picture ;
            i++ ) {
                tile_attribute_set_id [i]               ue(v)
            }
        }
    }
    ...
``` where
number_of_tile_attribute_sets_minus1 plus 1 specifies the number of attribute sets in the PPS;

tile_attribute [i] specifies the value of the tile attribute in the i-th tile attribute set; and
tile_attribute_set_id [i] specifies the tile attribute set id for the tile attribute set to be used for the i-th tile. The value of tile_attribute_set_id [i] shall be between 0 and number_of_tile_attribute_sets_minus1.

In the above syntax example there is only one tile attribute in the tile attribute set which is signaled using UVLC. In a general case, there could be more than one tile attribute in each tile attribute set, and each tile attribute may be signaled using UVLC, fixed length code, or a flag. If more than one tile attribute exists in the tile attribute sets, the number of tile attributes in the sets may be signaled to the decoder using a code word.

Embodiment 2—Signal the Number of Attributes

In a second embodiment, the number of attributes in each set may be different. In this case the number of tile attributes in each attribute set may be signaled to the decoder together with the attribute values. The loop for the tile attributes may be placed in the PPS or in a slice header or in a picture header or in a tile header. On the decoder side, the number of tile attribute sets, the number of attributes in each set and the attributes in each set are decoded. Finally, the tile_attribute_set_id is decoded to set the proper attribute values for each tile.

An example syntax table and semantics description for this embodiment on top of the HEVC video coding specification is presented in Table 4.

TABLE 4

Signaling the Number of Attributes

```
pic_parameter_set_rbsp( ) {
    Descriptor
    ...
    tiles_enabled_flag                                  u(1)
    ...
    if( tiles_enabled_flag ) {
        ...
        number_of_tile_attribute_sets_minus1            ue(v)
        for( i = 0; i <
        number_of_tile_attribute_sets_minus1+1; i++ ) {
            number_of_tile_attributes_in_set_minus1     ue(v)
            for( j = 0; j <
            number_of_tile_attributes_in_set_minus1+1 ;
            j++ ) {
                tile_attribute [i,j]                    ue(v)
            }
        }
        if(number_of_tile_attribute_sets_minus1 > 0) {
            for( i = 0; i < number_of_tiles_in_picture; i++ ) {
                tile_attribute_set_id [i,]              ue(v)
            }
        }
    }
    ...
``` where
number_of_tile_attribute_sets_minus1 plus 1 specifies the number of attribute sets for the tiles;
number_of_tile_attributes_in_set_minus1 plus 1 specifies the number of attributes in each tile attribute set
tile_attribute [i,j] specifies the value of the j-th tile attribute in the i-th tile attribute set; and
tile_attribute_set_id [i] specifies the tile attribute set id for the tile attribute set to be used for the i-th tile. The tile_attribute_set_id [i] shall be between 0 and number_of_tile_attribute_sets_minus1.

Embodiment 3—Attribute Values in PPS and Loop in Segment Header

In a third embodiment, the loop over the tiles is placed in a picture header, tile header or slice header. In the case where the loop over the tiles is placed in a tile header, the tile headers for the following tiles may be optional. At least one set of tile attributes is defined where each set contains at least one syntax element related to the tile attributes. In the tile or slice header, a loop over the tiles signals the index of the tile attribute set to use for each tile.

If each tile has a tile header and the loop over the tiles is placed in the tile header, then the loop over the tiles is only looped over the current tile associated with the tile header, i.e., the loop is only entered once.

A subset of the following example decoder steps may be used for this embodiment:

1. The decoder determines a number (N) of tile attribute sets from one or more code words in a bitstream where N>1.
2. For each tile attribute set, the decoder determines a number (M) of tile attribute values from code words in a bitstream where M>0 and the total number of attribute values is equal to N*M.
3. The decoder assigns each tile attribute set to a unique set id value (V). Optionally, the set id value (V) for the first attribute set in decoding order is 0, the set id value (V) for the second attribute set in decoder order is 1, and so on.
4. The decoder decodes a segment header and determines the number of tiles in the segment from code words in a parameter set or code words in the segment header.
5. For each tile (T) in the segment, the decoder determines a tile set id (I) from code words in the segment header and stores the set id (I) values in a list L.
6. The decoder decodes a particular tile (P) of the segment and determines a tile number for the tile P.
7. The decoder uses the tile number as an index in list L to determine a tile set id (I) for the tile P.
8. The tile set id (I) is used to select the tile attribute set assigned to set id value (V) equal to the tile set id (I).
9. The decoder uses the attribute values of the selected tile attribute set in the decoding process of tile P.

A segment is here a full picture or a part of a picture. The segment consists of a segment header and coded video data representing a part of a picture. The segment header consists of syntax elements and the value of those syntax elements are used to decode the coded video data representing the part of a picture. A segment may consist of multiple tiles and this particular type of segment may be called a tile group. A slice is one example type of segment and a tile group is another example type of segment. Embodiments are not limited to these two exemplary types.

Figure 6:
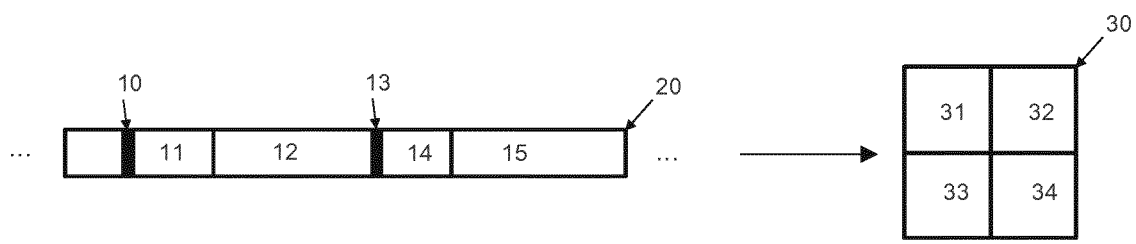
FIG. 6 illustrates decoding an example bitstream into a decoded picture according to one embodiment of the present disclosure.

The above decoder steps can be explained by the example shown in FIG. 6. The bitstream (20) is being decoded into a decoded picture (30) that consists of four tiles as shown (31, 32, 33, 34). The tile structure is conveyed to the decoder by the picture parameter set which is not shown in the figure. Assume that the decoder decodes that the number of attribute sets in this example is 3. The decoder then decodes 3 tile attribute sets and assigns the set id values 0, 1, 2 for the three sets.

The picture is split into two segments. One segment consists of tiles 31 and 32 and the other segment consists of tiles 33 and 34. The first segment consists of a segment header 10 and coded tiles 11 and 12 for tiles 31 and 32 respectively. The second segment consists of a segment header 13 and coded tiles 14 and 15 for tiles 33 and 34 respectively.

When the decoder decodes segment header 13, data in header 13 specifies that the segment consists of two tiles and that those are the third and fourth tiles in the picture. In segment header 13, there are two tile set id values, one for tile 33 and one for tile 34. When the decoder decodes the tile data 14, it uses the tile attribute set from the PPS that matches the tile set id value for tile 33. When the decoder decodes the tile data 15, it uses the tile attribute set from the PPS that matches the tile set id value for tile 34.

An example syntax table and semantics description for this embodiment on top of the HEVC video coding specification is presented in Table 5. In this example syntax table, it is assumed that the loop over the tiles is placed in a slice segment header.

TABLE 5

| Loop in Segment Header | |
|---|---|
| pic_parameter_set_rbsp( ) { | Descriptor |
| ... | |
|   tiles_enabled_flag | u(1) |
| ... | |
|   if( tiles_enabled_flag ) { | |
|     ... | |
|     number_of_tile_attribute_sets_minus1 | ue(v) |
|     for( i = 0; i < | |
|     number_of_tile_attribute_sets_minus1+1; i++ ) { | |
|       tile_attribute [i] | ue(v) |
|     } | |
|   } | |
|   ... | |
| } | |
| slice_segment_header( ) { | |
|   ... | |
|   if( tiles_enabled_flag ) { | |
|     if(number_of_tile_attribute_sets_minus1 > 0) | |
|     number_of_tiles_in_slice | ue(v) |
|     for( i = 0; i < number_of_tiles_in_slice ) { | |
|       tile_attribute_set_id [i] | ue(v) |
|     } | |
|   } | |
| } | | where
number_of tile_attribute_sets_minus1 plus 1 specifies the number of attribute sets in the PPS;
tile_attribute [i] gives the value of the tile attribute in the i-th tile attribute set;
number_of_tiles_in_slice specifies the number of tiles in the slice; and
tile_attribute_set_id [i] specifies that which tile attribute set should be assigned to i-th tile. The tile_attribute_set_id [i] shall be between 0 and number_of_tile_attribute_sets_minus1.

Embodiment 4—Attribute Signaling in Segment Header

In this embodiment, the attributes are not signaled in a parameter set. Instead, the attribute values are signaled in the segment header directly. The segment header is defined as in embodiment 3. In the segment header there are one or more code words that specify how many tiles there are in the segment as well as the spatial location of the tiles. Then there is at least one tile attribute value signaled for each tile of the segment.

A subset of the following example decoder steps may be used in this embodiment:
1. The decoder decodes a segment header and determines a number of tiles (N) in the picture or part of a picture from code words in a parameter set or code words in the segment header, where N>1.
2. The decoder creates a list L of size N where each entry in the list consists of at least one tile attribute value. The attribute values are decoded from the segment header.
3. The decoder decodes a particular tile (P) of the segment and determines a tile number for the tile P.
4. The decoder uses the tile number as an index in list L to select the tile attribute values to use for decoding tile P.
5. The decoder uses the selected attribute values in the decoding process of tile P.

An example syntax table and semantics description for this embodiment on top of the HEVC video coding specification is presented in Table 6.

TABLE 6

| Attribute Signaling in Segment Header |  |
|---|---|
| slice_segment_header( ) { | |
| ... | |
|   slice_address | u(v) |
|   if( tiles_enabled_flag ) { | |
|     number_of_tiles_in_slice | ue(v) |
|     for( i = 0; i < number_of_tiles_in_slice ; i++ ) { | |
|       tile_attribute [i] | ue(v) |
|     } | |
|   } | |
| } | | where
slice_address specifies the spatial location of the slice;
number_of_tiles_in_slice specifies the number of tiles in the slice. Together with the slice address value and tile partitioning information derived from other code words, a decoder can derive the spatial location of each tile in the slice;
tile_attribute [i] gives the value of the tile attribute of each tile in the slice.

Embodiment 5—Attribute Flags

In this embodiment, a set of tile attributes are signaled and then a set of flags are signaled for each tile to determine the usage of the tile attributes in the tile attribute set.

In a second variant of this embodiment, the signaled set of flags for each tile specifies to use or turn OFF the usage of each initial tile attribute value for that tile.

In a third variant of this embodiment, two states for each tile attribute are signaled, e.g. state 1 and state 2. Then a set of flags are signaled for each tile, one flag for each tile attribute, where each flag specifies to use the tile attribute with state 1 or state 2.

In a fourth variant of this embodiment, one set of the tile attributes are signaled, then for each tile and each attribute, a flag specifies if the initial value for the tile attribute is going to be used (e.g. flag=0) or if it should be overwritten (e.g. flag=1). In case of overwriting, the flag is followed by a codeword specifying the new value of the tile attribute.

An example syntax table and semantics description for Embodiment 2 on top of the HEVC specification is presented in Table 7:

TABLE 7

| Attribute Flags |  |
|---|---|
| pic_parameter_set_rbsp( ) { | Descriptor |
| ... | |
|   tiles_enabled_flag | u(1) |
| ... | |
|   if( tiles_enabled_flag ) { | |
|     ... | |
|     number_of_tile_attributes | ue(v) |
|     for( i = 0; i < number_of_tile_attributes; i++ ) { | |
|       tile_attribute [i] | ue(v) |
|     } | |
|     for( j = 0; j < number_of_tiles_in_picture ; j++ ) { | |
|       for( i = 0; i < number_of_tile_attributes ; i++ ) { | |
|         tile_attribute_overwrite_flag [l,j] | u(1) |
|         if(tile_attribute_overwrite_flag [l,j]) { | |
|           tile_attribute [i] | ue(v) |
|         } | |
|       } | |
|     } | |
|   } | |
| } | | where
number_of_tile_attributes specifies the number of tile attributes for the tiles in the picture;
tile_attribute [i] specifies the value of the i-th tile attribute in the tile attribute list; and
tile_attribute_overwrite_flag [i,j] equal to 0 specifies that the i-th tile attribute is to be used for the j-th tile. tile_attribute_overwriting_flag [i,j] equal to 1 specifies that the i-th tile attribute is to be overwritten at the j-th tile.

In yet another variant of this embodiment, instead of using an overwrite flag as in the example in Table 7, a flag is used to determine if an attribute value should be copied from the tile attribute list or explicitly signaled for a specific tile. The difference with the previous example is that the attribute list is kept static.

This is exemplified below with syntax and semantics on top of HEVC.

TABLE 8

| Attribute Flags |  |
|---|---|
| pic_parameter_set_rbsp( ) { | Descriptor |
| ... | |
|   tiles_enabled_flag | u(1) |
| ... | |
|   if( tiles_enabled_flag ) { | |
|     ... | |
|     number_of_tile_attributes | ue(v) |
|     for( i = 0; i < number_of_tile_attributes; i++ ) { | |
|       tile_attribute_in_list [i] | ue(v) |
|     } | |
|     for( j = 0; j < number_of_tiles_in_picture ; j++ ) { | |
|       for( i = 0; i < number_of_tile_attributes ; i++ ) { | |
|         tile_attribute_copy_flag [l,j] | u(1) |
|         if(tile_attribute_copy_flag [l,j]) { | |
|           tile_attribute [i] | ue(v) |
|         } | |
|       } | |
|     } | |
|   } | |
| } | | where
number_of_tile_attributes specifies the number of tile attributes for the tiles in the picture;
tile_attribute_in_list [i] specifies the value of the i-th tile attribute in the tile attribute list;

tile_attribute_copy_flag [i,j] equal to 1 specifies that the value of the i-th tile attribute for the j-th tile is to be copied from the tile attribute list. tile_attribute_copy_flag [i,j] equal to 0 specifies that the i-th tile attribute value is explicitly signaled for the j-th tile;

tile_attribute [i, j] specifies the value of the i-th tile attribute for the j-th tile. If tile_attribute_copy_flag [i,j] is equal to 1, then tile_attribute [i, j] is set equal to tile_attribute_in_list [i].

Embodiment 6—Delta QP

As stated earlier, one attribute that may be used in embodiments disclosed herein is delta_QP. In one embodiment, the decoder determines a reference QP value (refQP) from the sequences parameter set or picture parameter set. Then there is a delta QP value signaled for each tile using any of the previously described embodiments. Focusing on one tile T, let the corresponding delta QP value be deltaQP1. Optionally, there may be a deltaQP2 signaled for the first block of tile T. The QP value to use for the first block then becomes refQP+deltaQP1+deltaQP2. If there is no deltaQP2 for the block (for instance since the first block does not contain any non-zero transform coefficients), the QP value for the first block becomes refQP+deltaQP1, which is also called the initial QP value for the tile.

The QP value assigned for the first block is used for scaling decoded transform coefficients. It may also be used in the deblocking process of sample values near the boundary between the first block and a neighboring block. The possibility to signal a delta_QP per tile according to this embodiment is useful to stitch tiles originating from different bitstreams into one output bitstream. A tile T1 may have been encoded into a bitstream B1 using QP value Q1 and a tile T2 may have been encoded into a bitstream B2 using QP value Q2. If T1 and T2 are stitched into one output bitstream without the possibility to set a tile QP, it may not be possible to set the QP values for T1 and T2 correctly in the output stream. By making delta_QP part of the tile attributes and using one of the previous embodiments, correct QP values can be set for all output tiles by only changing values in headers. This is important, since changing values in the video coding layer requires rewriting a lot of data, since the video coding layer may be coded using arithmetic coding (such as CABAC).

Note that in HEVC, the block delta QP is only signaled for blocks that contain at least one non-zero transform coefficient. This means that if the first blocks in tile T1 and T2 do not contain any non-zero coefficient, it is impossible to assign the correct QP value for both blocks if tiles T1 and T2 are stitched together into one picture, unless slice headers are inserted As stated earlier, the HEVC specification specifies that the initial QP value to use for each tile (the Tile QP) is set to 26+init_qp_minus26+slice_qp_delta. One implementation of this embodiment on top of HEVC would be to set the initial QP value to use for a tile in a slice to:

$$QP=26+init\_qp\_minus26+slice\_qp\_delta+tile\_qp\_delta$$

or $$QP=26+init\_qp\_minus26+tile\_qp\_delta$$

where tile_qp_delta is conveyed in a codeword that is sent for each tile such that the value of tile_qp_delta can be different in each tile of a picture even if multiple pictures belong to the same slice or segment by using one of the aforementioned embodiments to signal tile_qp_delta as an attribute using a loop over the tiles method.

Alternatively, the QP to use for the first block is set to QP if the first block does not contain any transform coefficients or set to QP+dQP if the first block do contain transform coefficients, where dQP is a delta QP syntax element sent in the video coding layer.

Encoding Method

Figure 7:
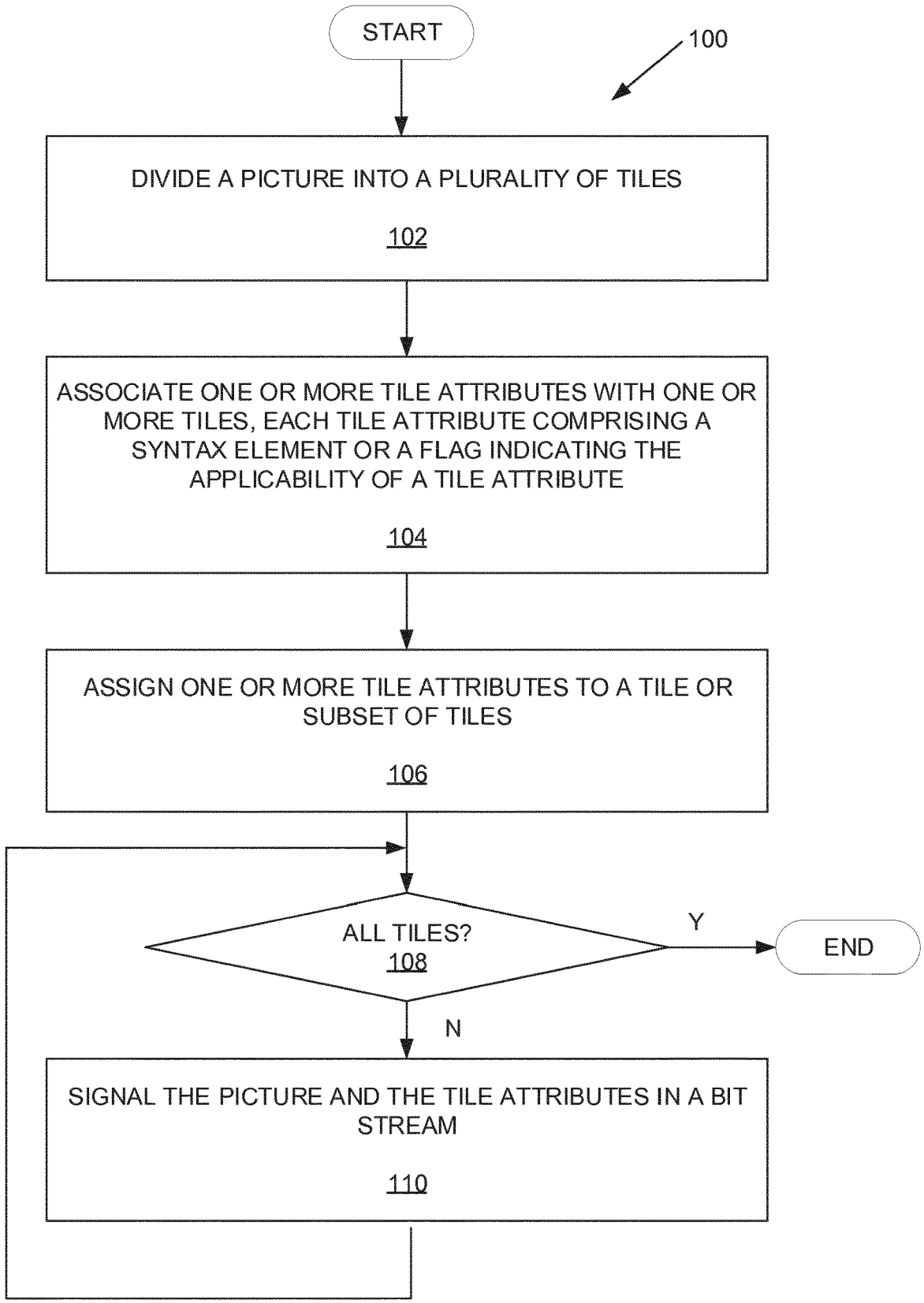
FIG. 7 is a flow diagram of a method of encoding a picture.

FIG. 7 depicts the steps in a method 100 of encoding a picture. A picture is divided into a plurality of tiles (block 102). One or more tile attributes are associated with one or more tiles (block 104). Each tile attribute comprises a syntax element or a flag indicating the applicability of a tile attribute. One or more tile attributes are assigned to a tile or subset of tiles (block 106). The picture and the tile attributes are signaled in a bit stream (110), wherein the tile attributes are signaled using one or more loops over the tiles (block 108).

Advantages

Embodiments of the present disclosure enable a more flexible assignment of tile attribute values than is possible in the prior art. A variety of use cases, such as 360-degree video and 2D plus depth formats, benefit from this flexible per-tile attributes assignment method, as the attribute values of different tiles in one picture can be tailored to the needs in each use case and then be signalled in a compact way using the proposed solution using a loop over the tiles.

In the embodiments disclosed herein, different tile attribute values can be assigned to separate tiles using only a tile partitioning tool. This is contrary to HEVC, where for the same purpose, both tile and slice partitioning tools must be used together.

The benefits of the embodiments disclosed herein are larger for use cases where different attribute values are suitable to be applied to different tiles in the same picture, based on the nature of the content (e.g. texture and depth information) or properties of the contents in different tiles such as quantization or noise levels, or dissimilar needs for different tiles in terms of post processing to suppress compression artifacts. In such applications the possibility for signaling per-tile attribute values is very beneficial.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Although described herein primarily as methods, using software pseudo-code to convey inventive concepts to those of skill in the art, embodiments of the present disclosure may be implemented as processes or methods; as encoding/decoding apparatuses; as transitory or non-transitory computer readable media containing instructions operative to cause processing circuitry to perform specified processes or methods; or as computer program products operative to cause processing circuitry to perform specified processes or methods.

What is claimed is:

1. A method of encoding a picture, the method comprising:

dividing a picture into a plurality of tiles, wherein at least one tile does not conform to a partition of the picture into rows and columns;

associating one or more tile attributes with one or more tiles, each tile attribute comprising a syntax element or a flag indicating the applicability of a tile attribute;

assigning one or more tile attributes to a tile or subset of tiles, wherein differing values of one or more tile attributes are assigned to at least two different tiles of the plurality of tiles; and signaling the picture and the tile attributes in a bit stream, the tile attributes signaled using one or more loops over the tiles.

2. The method of claim 1, wherein a tile attribute comprises one or more of a delta_QP, a deblocking strength, and a tile boundary treatment flag.

3. The method of claim 1, wherein:

associating one or more tile attributes with one or more tiles comprises defining one or more tile attribute sets, each tile attribute set having a unique set identifier; and signaling the tile attributes using one or more loops over the tiles comprises signaling, for each tile, the set identifier of a tile attribute set to be applied to that tile.

4. The method of claim 1, wherein a delta_QP is signaled per tile and a final value of initial tile quantization parameter (QP) or final value of block QP is calculated as a sum of a decoder reference QP value from a sequences parameter set or picture parameter set, plus the per-tile delta_QP, and optionally plus a delta_QP signaled for the block.

5. The method of claim 1, wherein
signaling the tile attributes using one or more loops over the tiles comprises placing the loop over tiles in a picture header, tile header, or slice header.

6. The method of claim 5 wherein the loop over tiles is placed in a tile header, and wherein tile headers for following tiles are optional.

7. The method of claim 2, further comprising:
determining a reference QP value (refQP) from a sequence parameter set or a picture parameter set;
determining one more delta_QP values for each tile; and
wherein signaling the tile attributes using one or more loops over the tiles comprises signaling at least the delta_QP values.

8. A picture encoder, comprising:
processing circuitry; and
memory containing instructions executable by the processing circuitry whereby the encoder is configured to
divide a picture into a plurality of tiles, wherein at least one tile does not conform to a partition of the picture into rows and columns;
associate one or more tile attributes with one or more tiles, each tile attribute comprising a syntax element or a flag indicating the applicability of a tile attribute;
assign one or more tile attributes to a tile or subset of tiles, wherein differing values of one or more tile attributes are assigned to at least two different tiles of the plurality of tiles; and
signal the picture and the tile attributes in a bit stream, the tile attributes signaled using one or more loops over the tiles.

9. The picture encoder of claim 8, wherein the memory further contains instructions executable by the processing circuitry whereby the encoder is configured to
divide a picture into a plurality of tiles, wherein at least one tile does not conform to a partition of the picture into rows and columns;
associate one or more tile attributes with one or more tiles, each tile attribute comprising a syntax element or a flag indicating the applicability of a tile attribute;
assign one or more tile attributes to a tile or subset of tiles, wherein differing values of one or more tile attributes are assigned to at least two different tiles of the plurality of tiles; and
signal the picture and the tile attributes in a bit stream, the tile attributes signaled using one or more loops over the tiles.

10. A method of decoding a picture, the method comprising:

receiving a bit stream comprising a picture divided into a plurality of tiles, wherein at least one tile does not conform to a partition of the picture into rows and columns, and one or more tile attributes associated with one or more tiles, wherein differing values of one or more tile attributes are associated with at least two different tiles of the plurality of tiles, each tile attribute comprising a syntax element or a flag indicating the applicability of a tile attribute; and applying the tile attributes to the tiles using one or more loops over the tiles.

11. The method of claim 10, wherein a tile attribute comprises one or more of a delta_QP, a deblocking strength, a deblocking filtering process, a sample adaptive offset (SAO) process, a loop filtering process, and a tile boundary treatment flag. insert.

12. The method of claim 10, wherein:
the tile attributes associated with one or more tiles comprise one or more tile attribute sets, each tile attribute set having a unique set identifier; and
wherein receiving tile attributes associated with one more tiles comprises receiving, for each tile, the set identifier of a tile attribute set to be applied to that tile.

13. The method of claim 10, wherein values of the one or more tile attributes are received in a Picture Parameter Set and the loop over tiles is received in a tile or slice header.

14. The method of claim 10, wherein the tile attributes are received directly in a segment header.

15. The method of claim 10, wherein a delta_QP is received per tile and a final value of initial tile quantization parameter (QP) or final value of block QP is calculated as a sum of a decoder reference QP value from a sequences parameter set or picture parameter set, plus the per-tile delta_QP, and optionally plus a delta_QP received for the block.

16. The method of claim 12, wherein receiving tile attributes associated with one more tiles comprises:
parsing a number of tile attribute sets;
for each tile attribute set, parsing the tile attributes in that set, storing the values (A) and assigning them to a set id;
for a tile (T) in a picture, parsing a tile_attribute_set_id code word and using the value (B) of tile_attribute_set_id to identify a tile attribute set; and
using the values (A) stored and assigned to the set id that corresponds to the value (B) to decode the tile (T).

17. The method of claim 10 wherein the loop over tiles is in a tile header, and wherein tile headers for following tiles are optional.

18. The method of claim 10, wherein receiving tile attributes associated with one or more tiles comprises:
decoding a segment header and determining a number of tiles (N) in the picture or part of a picture from code words in a parameter set or code words in the segment header, where N>1;

creating a list L of size N where each entry in the list consists of at least one tile attribute value decoded from the segment header;

decoding a particular tile (P) of the segment and determining a tile number for the tile P;

using the tile number as an index in list L to select the tile attribute values to use for decoding tile P; and using the selected attribute values in the decoding process of tile P.

19. The method of claim 18 further comprising:

receiving one or more code words specifying how many tiles there are in the segment and the spatial location of the tiles; and receiving at least one tile attribute value for each tile of the segment.

20. The method of claim 10, wherein receiving the tile attributes using one or more loops over the tiles comprises receiving a set of tile attributes, and then receiving a set of flags for each tile, the flags indicating the usage of the tile attributes in the tile attribute set for the associated tile.

21. The method of claim 20, wherein the received set of flags for each tile specifies whether to use or turn OFF the usage of each initial tile attribute value for that tile.

22. The method of claim 20, wherein receiving the tile attributes using one or more loops over the tiles comprises at least one of:

receiving first and second states for each tile attribute, and receiving a set of flags for each tile, one flag for each tile attribute, wherein each flag indicates to use the tile attribute with the first or second state;

receiving first and second states for each tile attribute, and receiving a set of flags for each tile, one flag for each tile attribute, wherein each flag indicates to use the tile attribute with the first or second state; and receiving one set of tile attributes, and for each tile and each tile attribute in the set, receiving a flag indicating whether the initial value for the tile attribute should be used, or whether it should be overwritten, and if the flag indicates the initial file attribute value should be overwritten, receiving a codeword specifying a new value of the tile attribute.

23. The method of claim 10, further comprising:

receiving a reference QP value (refQP) in a sequence parameter set or a picture parameter set;

receiving one more delta_QP values for each tile; and calculating a QP value for a block in a tile as the sum of the reference QP and all delta_QP values for that tile.

24. A picture decoder, comprising:

processing circuitry; and memory containing instructions executable by the processing circuitry whereby the encoder is configured to
receive a bit stream comprising a picture divided into a plurality of tiles, wherein at least one tile does not conform to a partition of the picture into rows and columns, and one or more tile attributes associated with one or more tiles, wherein differing values of one or more tile attributes are associated with at least two different tiles of the plurality of tiles, each tile attribute comprising a syntax element or a flag indicating the applicability of a tile attribute; and apply the tile attributes to the tiles using one or more loops over the tiles.

25. The picture decoder of claim 24, wherein the memory further contains instructions executable by the processing circuitry whereby the decoder is configured to receive a bit stream comprising a picture divided into a plurality of tiles, wherein at least one tile does not conform to a partition of the picture into rows and columns, and one or more tile attributes associated with one or more tiles, wherein differing values of one or more tile attributes are associated with at least two different tiles of the plurality of tiles, each tile attribute comprising a syntax element or a flag indicating the applicability of a tile attribute; and apply the tile attributes to the tiles using one or more loops over the tiles.

* * * * *

UNITED STATES PATENT AND TRADEMARK OFFICE
CERTIFICATE OF CORRECTION

PATENT NO. : 11,503,308 B2
APPLICATION NO. : 17/282237
DATED : November 15, 2022
INVENTOR(S) : Rickard Sjöberg, Mitra Damghanian and Martin Pettersson It is certified that error appears in the above-identified patent and that said Letters Patent is hereby corrected as shown below:

In the Claims

Column 8, Line 48, delete "encoder", and insert --decoder--, therefor.

Signed and Sealed this
Twenty-eighth Day of February, 2023

Katherine Kelly Vidal
Director of the United States Patent and Trademark Office